United States Patent
Mäkelä et al.

(10) Patent No.: US 8,245,971 B2
(45) Date of Patent: Aug. 21, 2012

(54) CURVED ELEMENT, WING, CONTROL SURFACE AND STABILIZER FOR AIRCRAFT

(75) Inventors: Juha Mäkelä, Nokia (FI); Juha Halme, Tampere (FI); Lauri Halme, Tampere (FI); Mikko Hoffrén, Nokia (FI)

(73) Assignee: Patria Aerostructures Oy, Halli (FI)

( * ) Notice: Subject to any disclaimer, the term of this patent is extended or adjusted under 35 U.S.C. 154(b) by 435 days.

(21) Appl. No.: 12/442,140

(22) PCT Filed: Sep. 25, 2007

(86) PCT No.: PCT/FI2007/050510
§ 371 (c)(1),
(2), (4) Date: Mar. 30, 2010

(87) PCT Pub. No.: WO2008/037847
PCT Pub. Date: Apr. 3, 2008

(65) Prior Publication Data
US 2010/0181427 A1 Jul. 22, 2010

(30) Foreign Application Priority Data
Sep. 26, 2006 (FI) .................................. 20060858

(51) Int. Cl.
*B64C 1/00* (2006.01)

(52) U.S. Cl. ................. 244/123.12; 244/123.1
(58) Field of Classification Search ............ 244/119, 244/118.1, 129.1, 123.12, 123.1; 156/198
See application file for complete search history.

(56) References Cited

U.S. PATENT DOCUMENTS

| | | | | |
|---|---|---|---|---|
| 1,875,651 | A * | 9/1932 | Phelan | 244/123.12 |
| 2,382,835 | A * | 8/1945 | Watter | 52/84 |
| 2,382,950 | A * | 8/1945 | Watter | 244/123.2 |
| 2,392,818 | A * | 1/1946 | Grafman | 52/636 |
| 2,395,205 | A * | 2/1946 | Watter | 52/506.06 |
| 2,429,144 | A * | 10/1947 | Watter | 29/469 |
| 4,230,293 | A * | 10/1980 | Hamm et al. | 244/119 |
| 4,452,657 | A * | 6/1984 | Hamm | 156/198 |
| 5,687,538 | A * | 11/1997 | Frobosilo et al. | 52/846 |
| 6,427,945 | B1 * | 8/2002 | Bansemir | 244/129.1 |
| 6,702,911 | B2 * | 3/2004 | Toi et al. | 156/93 |
| 7,074,474 | B2 * | 7/2006 | Toi et al. | 428/102 |
| 2003/0226935 | A1 | 12/2003 | Garratt et al. | |
| 2006/0032982 | A1 | 2/2006 | Stephens | |
| 2008/0223986 | A1 * | 9/2008 | Kaye | 244/119 |
| 2010/0181427 | A1 * | 7/2010 | Makela | 244/123.12 |

OTHER PUBLICATIONS

Swanson, G.D., Gurdal, Z., Starness, J.H. Jr., Structural efficiency study of composite wing rib structures, NASA report NASA-CR-183004 (CCMS-88-18), pp. 3, 5, 117, 119 and pictures 1, 68.

* cited by examiner

*Primary Examiner* — Tien Dinh
*Assistant Examiner* — Justin Benedik
(74) *Attorney, Agent, or Firm* — Ladas & Parry LLP

(57) ABSTRACT

A curved element, a wing, a control surface and a stabilizer for an aircraft. The curved element (7) is of a composite material and comprises surfaces (14, 21) provided with a plurality of profile reinforcements (20, 25). The profile reinforcements constitute an integrated part of the structure of the surfaces and have a directed strength effect. The profile reinforcements may be arranged in a manner constituting a latticed support structure.

17 Claims, 6 Drawing Sheets

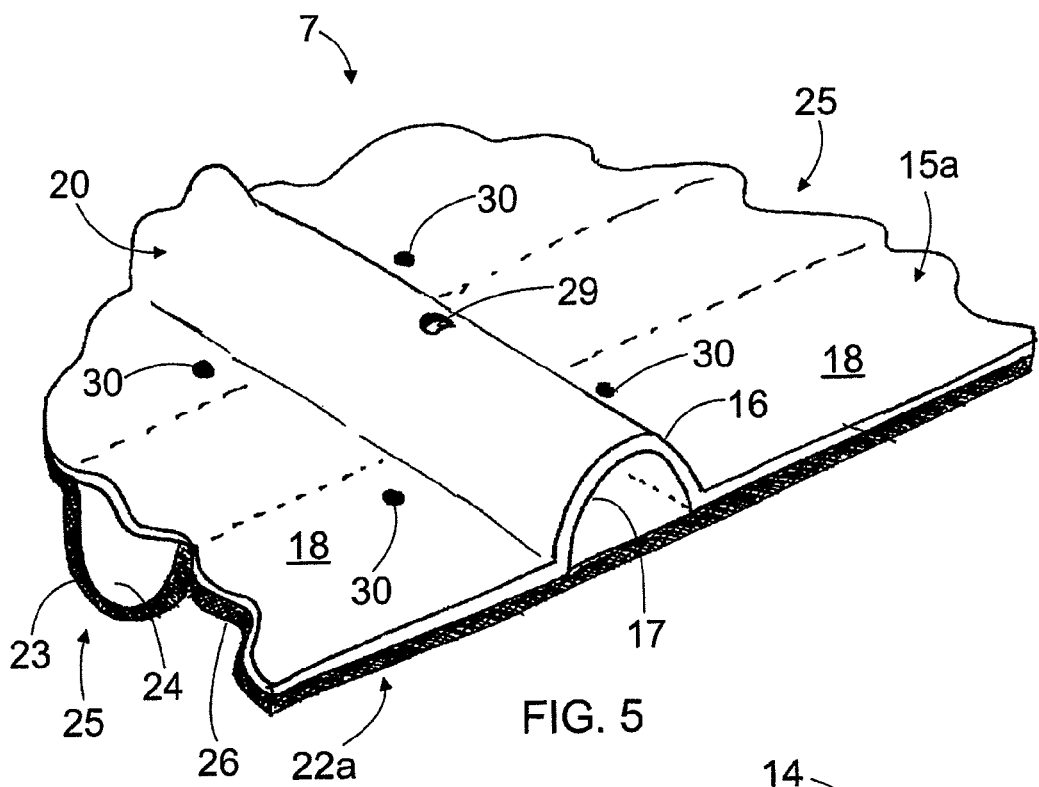
FIG. 5
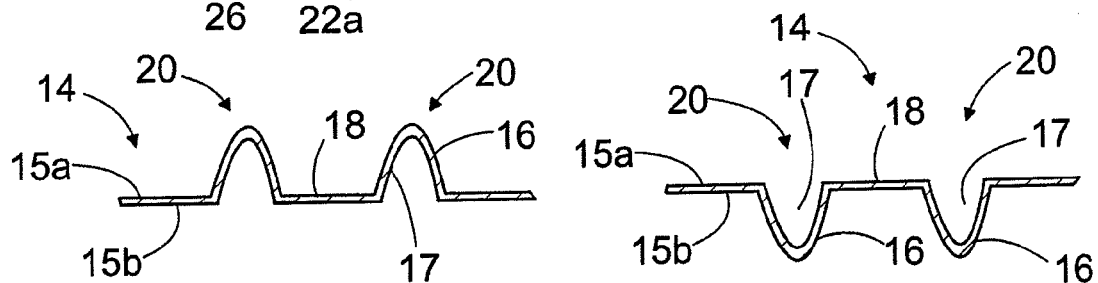
FIG. 6a   FIG. 6b
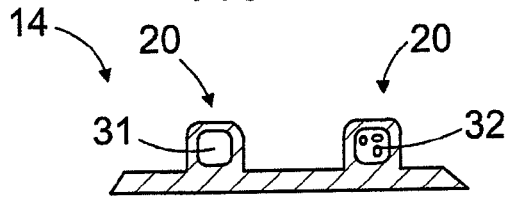 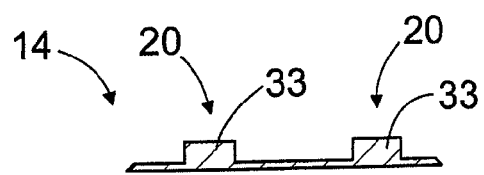
FIG. 6c   FIG. 6d
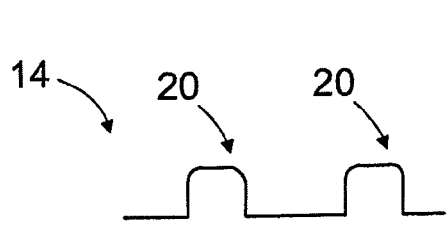 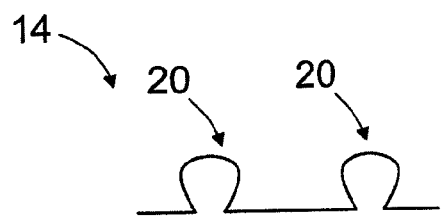
FIG. 6e   FIG. 6f

CURVED ELEMENT, WING, CONTROL SURFACE AND STABILIZER FOR AIRCRAFT

BACKGROUND OF THE INVENTION

The invention relates to a curved element for use in the support structures of the wings and control surfaces of an aircraft. The invention further relates to a wing, a control surface and a stabilizer for an aircraft. The object of the invention is disclosed more closely in the preambles of the independent claims.

The wing of aircrafts, such as airplanes and the like, comprises skin plates, between which the actual support structure of the wing is arranged and typically comprises a front spar and a rear spar in the longitudinal direction of the wing and wing ribs connecting them in the transverse direction of the wing. Usually a plurality of stringers is further provided between the wing ribs and the skin plates. The structure of the stabilizers and the control surfaces, such as spoilers, landing flanges, rudders etc., for example, is typically similar to that of the wing and comprises curved elements corresponding to the wing ribs.

Instead of conventional components manufactured from metal parts by riveting, structural parts manufactured from a composite material are increasingly used in modern aircrafts. The weight of the structures can be lowered by the use of composite materials. In known composite solutions, a plurality of adjacent reinforcement pieces are fastened to the vertical skin plates of the wing rib by gluing or, alternatively, by fastening them with mechanical fastening elements, such as rivets or screws. However, the assembly of such curved elements from a plurality of separate components is slow. Furthermore, discontinuities exist between the separate parts, which is undesirable from the point of view of the strength theory.

BRIEF DESCRIPTION OF THE INVENTION

The object of this invention is to provide a new and improved curved element and a wing, a control surface and a stabilizer provided with such a curved element.

The curved element of the invention is characterized in that the curved element comprises a first skin plate and a second skin plate; and that at least one surface of both skin plates is provided with a plurality of directed profile reinforcements constituting an integrated part of the profile of the skin plate.

The wing of the invention is characterized in that at least one wing rib comprises a first skin plate and a second skin plate; and that at least one surface of both skin plates is provided with a plurality of directed profile reinforcements constituting an integrated part of the profile of the skin plate.

The control surface of the invention is characterized in that at least one curved element comprises a first skin plate and a second skin plate; and that at least one surface of both skin plates is provided with a plurality of directed profile reinforcements constituting an integrated part of the profile of the skin plate.

The stabilizer of the invention is characterized in that at least one curved element comprises a first skin plate and a second skin plate; and that at least one surface of both skin plates is provided with a plurality of directed profile reinforcements constituting an integrated part of the profile of the skin plate.

The idea of the invention is that the curved element made from a composite material comprises a first skin plate and a second skin plate. A plurality of directed reinforcements is integrated into at least one surface of both skin plates. The reinforcements constitute part of the profile of the skin plate.

An advantage of the invention is that the manufacture of the curved element is easier and faster, the reinforcements being integrated into the skin plates of the curved element. Furthermore, as regards strength, reinforcements integrated into a structure are better than a plurality of separate reinforcement pieces to be fastened to the skin plates. This enables the avoidance of discontinuities between the reinforcements integrated into the structure and the skin plates.

The idea of an embodiment of the invention is that the curved element is provided with reinforcements directed in at least two directions transverse relative to each other, the directed reinforcements forming a latticed reinforcement structure in the curved element, which is advantageous as regards strength.

The idea of an embodiment of the invention is that at least one surface of at least one skin plate is corrugated in at least one or more predetermined sections of the surface of the skin plate. The profile of the second skin plate may also be corrugated or it may comprise different profile reinforcements.

The idea of an embodiment of the invention is that at least one skin plate of the curved element is composed of one or more skin plate components. One skin plate component covers the exterior surface of the curved element only at the desired point. This being so, at least part of the interior surface of the skin plate may be visible or several skin plate components may together constitute a full-sized skin plate. The skin plate component is provided with profile reinforcements.

The idea of an embodiment of the invention is that a protrusion provided on one side of the skin plate or the skin plate profile and a groove on the other opposite side constitute the profile reinforcement.

The idea of an embodiment of the invention is that a thickening provided in the skin plate or the skin plate profile constitutes the profile reinforcement, the thickening having a larger material thickness compared with the sections between the profile reinforcements. The arrangement of such a thickening into the structure is quite simple.

The idea of an embodiment of the invention is that the trans-verse profile reinforcements are directed perpendicularly relative to each other.

The idea of an embodiment of the invention is that the profile reinforcements directed transverse relative to each other are arranged diagonally, whereby they assume a predetermined angle relative to the longitudinal axis of the curved element.

The idea of an embodiment of the invention is that the curved element comprises a first skin plate and a second skin plate, whose exterior surfaces constitute the visible surfaces of the curved element. The first skin plate and the second skin plate are interconnected components prefabricated at separate manufacturing stages. One or more intermediate plates or another reinforcement element, for example, may constitute an additional reinforcement between the skin plates.

The idea of an embodiment of the invention is that the curved element comprises a first skin plate and a second skin plate, which are components prefabricated at separate manufacturing stages. The interior surfaces of the first skin plate and the second skin plate are coupled against one another. The coupling may have been made with an adhesive, for example.

The idea of an embodiment of the invention is that the first skin plate and the second skin plate are fastened to one another with not only an adhesive, but also with a plurality of mechanical fastening means, such as rivets or a bolt joint, for example. In this case, the mechanical fastening members serve as a safety feature for the coupling made with the adhesive.

The idea of an embodiment of the invention is that the curved element is an integral piece, from which different parts cannot be detached without breaking the structure. In this case, the curved element is not assembled from components manufactured at separate stages, but it can have been manufactured in one step by casting in a mould. The manufacture may have taken place by the RTM method, for example. When the curved element is an integral piece, its manufacture may be fast. In addition, an integral piece is advantageous from the point of view of the strength theory.

The idea of an embodiment of the invention is that the cross-section of the reinforcement is substantially constant when viewed in the longitudinal direction of the reinforcement.

The idea of an embodiment of the invention is that the cross-section of the reinforcement is arranged to change when viewed in the longitudinal direction of the reinforcement. The reinforcement may comprise a trans-verse extension or narrowing, for example, its height may decrease or increase when viewed in the longitudinal direction or the shapes of the cross-section of the reinforcement may change in other manners when viewed in the longitudinal direction. By changing the shape of the cross-section of the reinforcement, the strength achieved may be adjusted.

The idea of an embodiment of the invention is that the reinforcement forms a hollow space. The hollow space is, provided with one or more openings for emptying any condensation water.

The idea of an embodiment of the invention is that the reinforcement forms a hollow space filled with an insert. Alternatively, the hollow space is filled with filler material, such as foam or a corresponding light substance, for example.

The idea of an embodiment of the invention is that the wing rib is manufactured from a composite material, wherein the binding agent is a plastic material. The plastic material may be a thermoplastic material or a thermosetting material. A typical binding agent is resin. Furthermore, the reinforcement fibre may be carbon fibre or aramid, for example.

BRIEF DESCRIPTION OF THE FIGURES

Some embodiments of the invention will be described in more detail in the accompanying drawings, in which FIG. 1 schematically shows a wing of an aircraft, the support structure of which comprises a plurality of curved elements, FIG. 2 schematically shows a tail of an aircraft, comprising stabilizers and control surfaces, the support structure of which may comprise a plurality of curved elements, FIG. 3a schematically shows a first skin plate of a curved element, FIG. 3b schematically showing a second skin plate.

In the figures, some embodiments of the invention are described in a simplified manner for the sake of clarity. Like parts are denoted by like reference numerals in the figures.

DETAILED DESCRIPTION OF SOME EMBODIMENTS OF THE INVENTION

Figure 1:
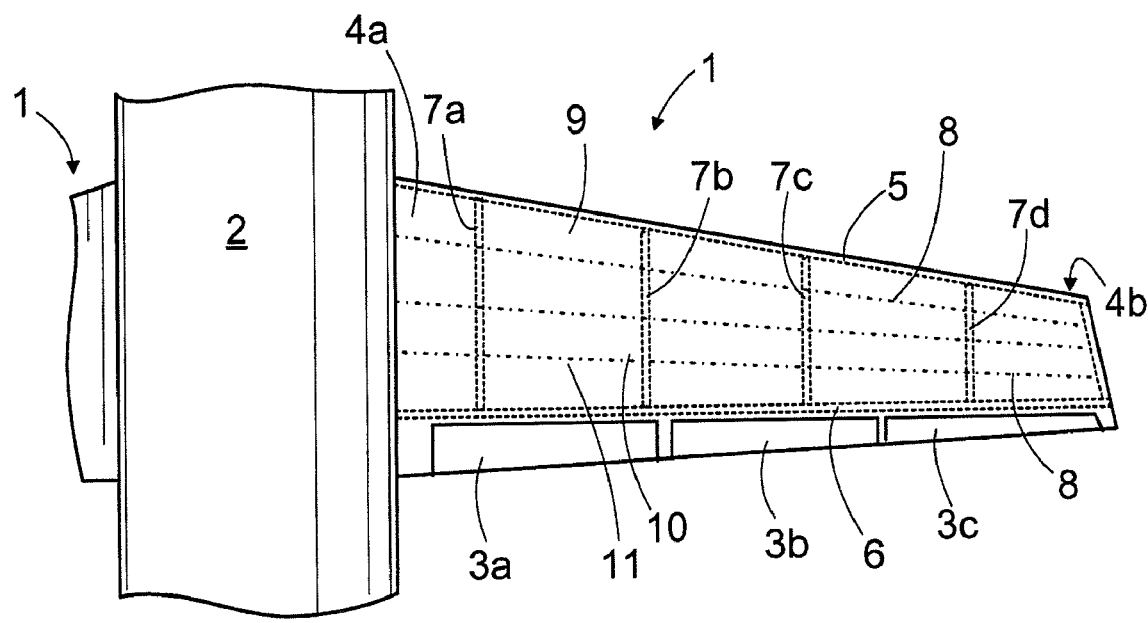

FIG. 1 shows a wing 1 that is fastened to a frame 2 of an aircraft. The trailing edge of the wing 1 may comprise movable control surfaces 3a to 3c. The wing 1 may comprise an upper skin plate 4a and a lower skin plate 4b, between which is arranged a support structure for the wing that may comprise a front spar 5 and a rear spar 6, and a plurality of wing ribs 7 arranged between the spars. Thus, the front and rear bars 5, 6 are reinforcements substantially in the longitudinal direction of the wing, whereas the wing ribs 7 are reinforcements in the transverse direction of the wing. In addition, the support structure may include a plurality of stringers 8, which may be fastened to the inner surface of the skin plates 4a, 4b and to the wing ribs 7. The wing rib 7 may be a curved element of the invention.

Figure 2:
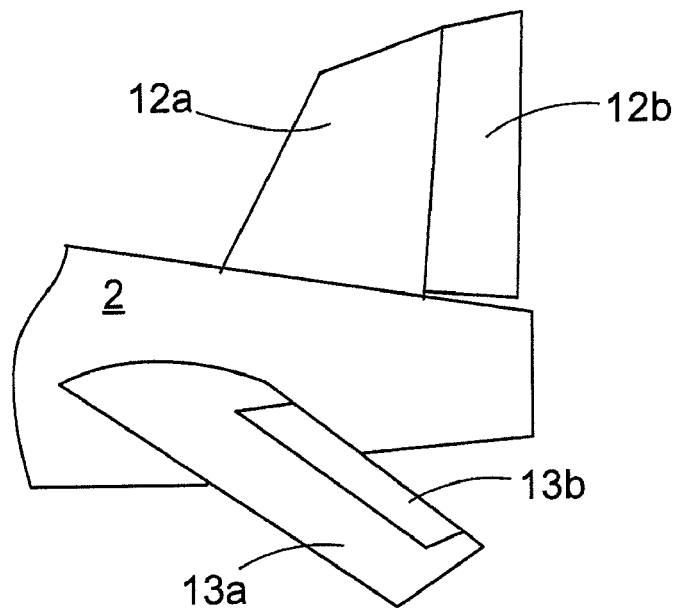

FIG. 2 shows the tail of an airplane, comprising fixed stabilizers 12a, 13a, and movable control surfaces 12b, 13b. The support structures of these stabilizers and control surfaces may incorporate a curved element of the invention.

Figure 3A:
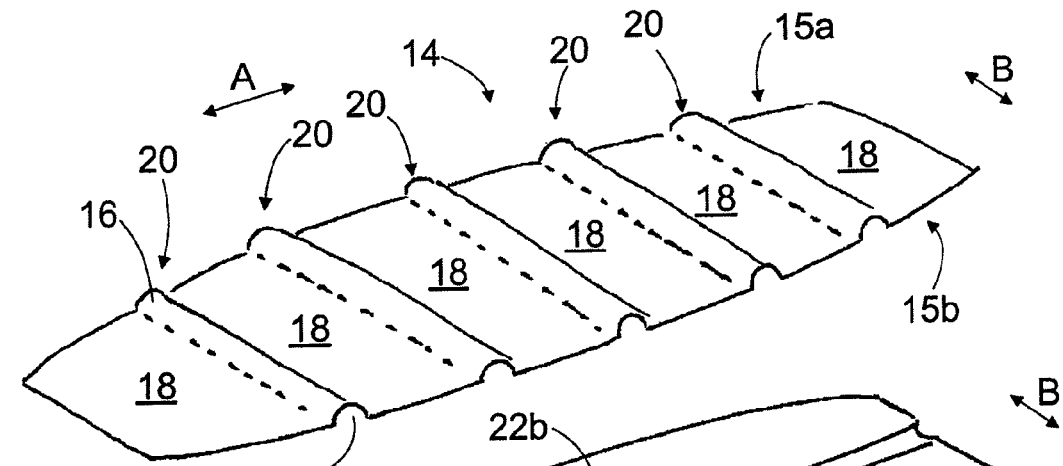

FIG. 3a shows a first skin plate 14 of the curved element 7, which may be a component prefabricated from a composite material. The outer surface 15a of the first skin plate 14 may comprise curved protrusions 16 arranged transversely relative to the longitudinal direction A of the curved element 7, and, correspondingly, the inner surface 15b may comprise curved grooves 17. Accordingly, both surfaces of the skin plate 14 have a corrugated profile. Substantially planar sections 18 may be arranged between the protrusions 16 and the grooves 17, and at the ends. The protrusions 16 and the grooves 17 form transverse structural reinforcements 20 in the skin plate 14 that have a directed strength effect. In fact, the flexural stiffness of the surface element 14 in a direction transverse relative to the longitudinal direction of the reinforcements 20 is substantially larger than in other directions. The number of reinforcements 20, their distance from each other, and other dimensions may be determined in accordance with the strength required.

Figure 3B:
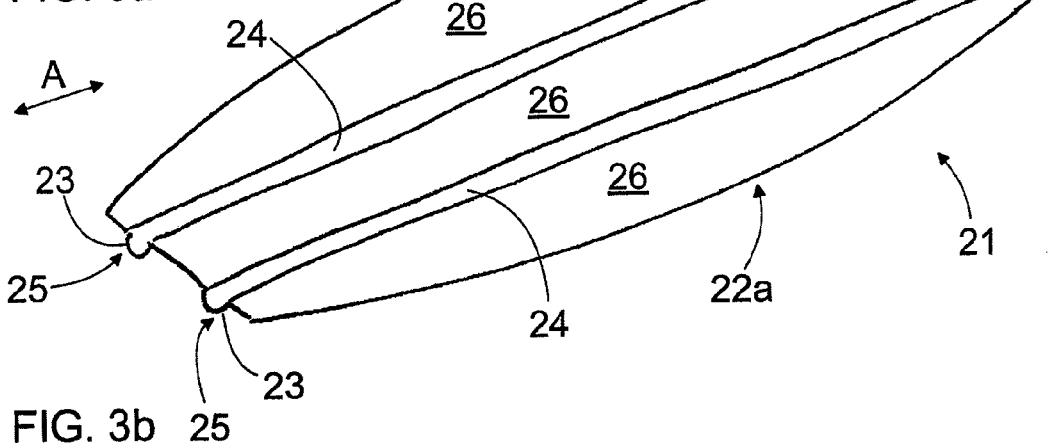

FIG. 3b shows a second skin plate 21 of the curved element 7, which, too, may be a component prefabricated from a composite material. The skin plate 21 comprises an outer surface 22a and an inner surface 22b. Compared with the first skin plate 14 shown in FIG. 3b, a difference is at least the fact that reinforcements 25 composed of protrusions 23 and grooves 24 are in the longitudinal direction A of the curved element, i.e. transversely relative to the reinforcements 20. Substantially planar sections 26 may be arranged between the reinforcements 25 and at the longitudinal edges of the skin plate 21. The reinforcements 25 formed in the surface profile of the skin plate 21 provide a directed strength effect that tends to prevent the curved element 7 from bending in a direction transverse relative to the longitudinal direction of the reinforcements 25. The number of reinforcements 25, their distance from each other, and other dimensions may be determined in accordance with the strength required.

The composite structure of the first skin plate 14 and the second skin plate 21 may comprise a plurality of parallel reinforcement fibres. There may be one or more such reinforcement fibre layers. The direction of the reinforcement fibres in the different layers may be the same or different. Alternatively, the composite structure may comprise a netlike fibre reinforcement in one or more layers. The binding agent may be resin or another suitable plastic material, for example. The skin plates 14, 21 may be manufactured by means of a suitable mould.

Figure 4:
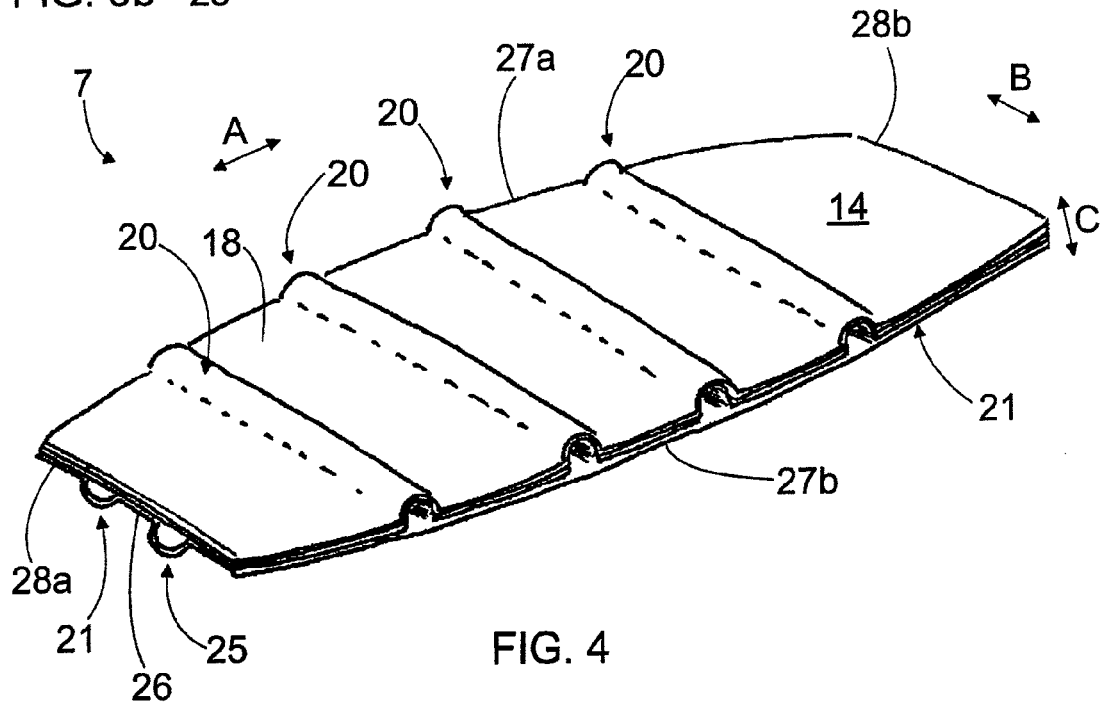
FIG. 4 schematically shows a curved element assembled by fastening the interior surfaces of the skin plates of FIGS. 3a and 3b against one another, FIG. 5 schematically shows a detail of the curved element of FIG. 4, FIGS. 6a to 6f schematically show cross-sections of different possibilities of forming integrated profile reinforcements onto the surface of a curved element, FIG. 7a schematically shows a side view of a curved element provided with diagonal reinforcements, FIG. 7b schematically shows a side view of a curved element, wherein longitudinal reinforcements of the curved element extend along the length of the entire curved element and wherein transverse reinforcements are arranged only in surface components on the sections of the ends of the curved element, FIG. 7c schematically shows a side view of a curved element, wherein the distance between the longitudinal reinforcements of the curved element is constant, whereas the sections of the ends of the curved element are provided with transverse reinforcements more densely than the middle section, FIG. 7d schematically shows a side view of a curved element, in this case a wing rib, provided with manholes and flanges, FIG. 7e schematically shows a side view of a curved element, reinforcements provided in whose surface profile being protrusions or grooves having a predetermined length, optionally arranged transversely relative to each other, thus together forming a latticed structure, FIGS. 8a to 8c schematically show different end views of some curved elements, FIG. 9 schematically shows a so-called exploded view of the principle of an alternative curved element, and FIG. 10 schematically shows the solution of FIG. 9 in an assembled state.

FIG. 4 shows the curved element 7 in an assembled state. The inner surface 15b of the first skin plate 14 and the inner surface 22b of the second skin plate 21 are disposed against each other and fastened to each other with glue, mechanical fastening elements or a combination thereof, for example. As the figure shows, the structural reinforcements 20, 25, integrated into the skin plates, are arranged transversely relative to each other, whereby they form a kind of a latticed structure that is known to receive loads well. The planar sections 18, 26 of the skin plates 14, 21 constitute beneficial counter surfaces, at which the skin plates 14, 21 may be fastened rigidly to each other. FIG. 4 illustrates that the structure of the curved element 7 may be very thin in the direction C of the thickness. Although the structure is thin and light, it is, however, very rigid thanks to the profile reinforcements arranged in a latticed manner.

FIG. 4 further shows that long sides 27a and 27b of the curved element 7 are curved surfaces, whereto the skin plates of the wing 1 or the control surface may be fastened. If need be, stringers may be arranged between the sides 27a, 27b and the skin plates. Furthermore, the long sides 27a, 27b of the curved element 7 may be provided with suitable fastening elements that facilitate the fastening of the skin plates or the stringers. The front spar and, correspondingly, the rear spar of the wing or the control surface may be fastened to the short sides, i.e. ends 28a, 28b, of the curved element 7. The edges 28a, 28b may be shaped in the desired manner for fastening the spars or they may be provided with suitable fastening elements.

FIG. 5 shows a detail of the curved element 7 of FIG. 4. Since the reinforcements 20, 25 form hollow spaces inside the structure, the reinforcements 20, 25 may be provided with drain holes 29, via which any condensation water generated as a result of temperature changes inside the structure is able to flow out of the structure. In addition, the fastening of the skin plates 14, 21 to each other may be secured with mechanical fastening members 30, such as rivets, screws or the like, for example. The fastening may be carried out at the planar sections 18, 26.

FIG. 6a shows an alternative profile for the reinforcement 20 of the first skin plate 14. Compared with the form of profile shown in the previous figures, the profile shown in FIG. 6a is higher and narrower. The height of the profile substantially affects the flexural stiffness of the reinforcement 20. The profile of the reinforcement 25 of the second skin plate 21 may be similar to or different from that of the reinforcement 20, whereby the flexural stiffness of the curved element 7 may be different in different directions. Furthermore, the same skin plate 14, 21 may comprise reinforcements 20 and 25 having different forms of profile. Accordingly, the tensile properties of the curved element 7 may be affected versatilely by selecting suitable forms and dimensions of profile.

The profile of the skin plate 14 shown in FIG. 6b substantially corresponds to that shown in FIG. 6a, the difference being that the protrusions 16 are now on the side of the inner surface 15b of the skin plate 14, the grooves 17 being on the side of the outer surface 15a. In a similar manner, the second skin plate 21 may be provided with protrusions on the side of the inner surface 22b or on the side of the outer surface 15b.

FIG. 6c shows a skin plate 14 provided with a structural profile reinforcement 20 comprising a hollow space 31 that may be manufactured by means of a removable or melting core. Alternatively, the hollow space may be filled with some light filler material, such as foam 32 of a plastic material, for example.

FIG. 6d shows a skin plate 14 provided with a locally larger material thickness 33 forming a structural, directed profile reinforcement 20 in the skin plate 14. The cross-sectional shape and other dimensions of the thickening 33 may be selected as desired.

FIGS. 6e and 6f further show some feasible, pronouncedly simplified cross-sectional shapes of the profile reinforcements of a skin plate.

Figure 7A:
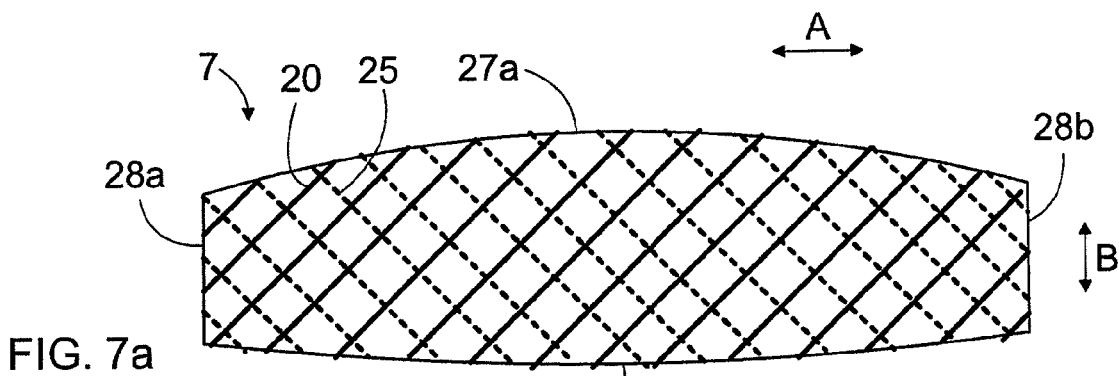

FIG. 7a shows that the directed reinforcements 20, 25 of the curved element 7 may be arranged diagonally relative to each other. The angle of the reinforcements 20, 25 relative to the longitudinal axis of the curved element 7 may be selected as desired. The angle may be 45 degrees, for example. In this embodiment, too, the profile reinforcements 20, 25 are arranged transversely relative to each other and thus they constitute a structural lattice profile in the curved element 7.

Figure 7B:
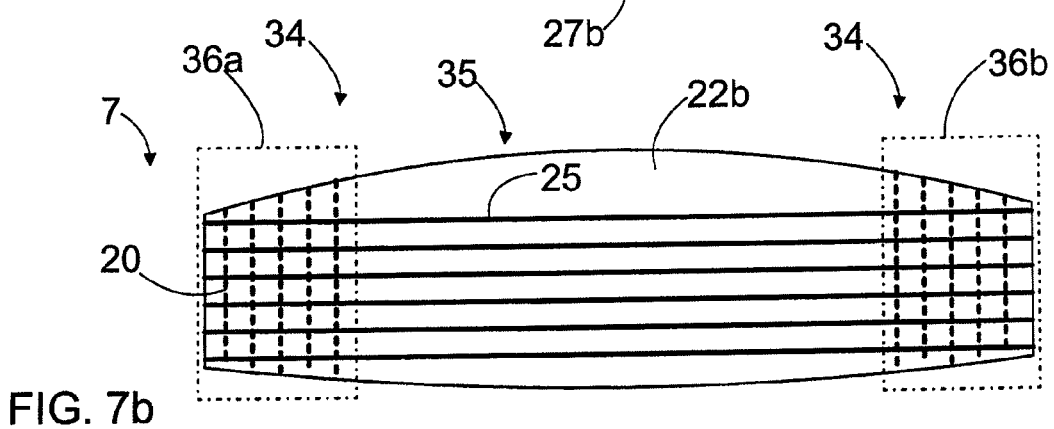

FIG. 7b shows that, if need be, a desired section may be provided with a reinforcement 20, 25 only in one direction. Furthermore, some section of the curved profile 7 may be arranged totally without reinforcements 20, 25. In the situation of FIG. 7b, the reinforcements 20, 25 on the sections 34 of the ends of the curved element are arranged crosswise, whereas the middle section 35 has no reinforcements in the transverse direction B. Instead of an integral first skin plate 14, the sections 34 may comprise skin plate components 36a and 36b that only cover the sections of the ends 34, but do not extend to the middle section 35. In this case, the visible surface on the middle section 35 is the inner surface 22b of the skin plate 21. Alternatively, the middle section 35 may be provided with a skin plate component, which is provided with reinforcements and does not extend at all to the end 34 sections, the inner surface 22b of the skin plate 21 being visible at the ends.

Figure 7C:
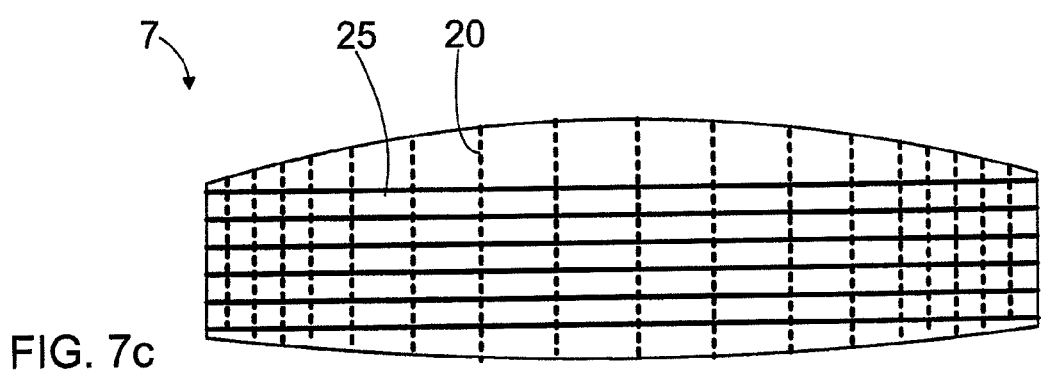

FIG. 7c illustrates that the distance between the reinforcements 20, 25 may be constant or it may change stepwise or steplessly in accordance with the desired strength properties.

Figure 7D:
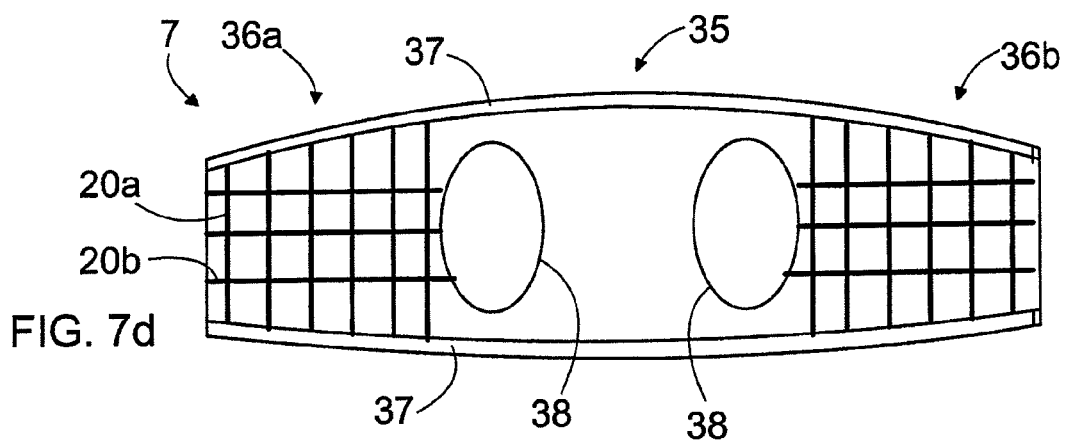

The curved element 7 shown in FIG. 7d comprises flanges 37 on the curved long sides 27a, 27b. The flanges 37 may facilitate the fastening of the skin plates or the stringers of the wing or the control surface. In addition, the flanges 37 may serve to increase the rigidity of the curved element 7. FIG. 7d further shows that the curved element, particularly when a wing rib is concerned, may comprise one or more manholes 38 for facilitating maintenance and installation. Smaller curved elements, such as the curved elements of stabilizers, for example, may comprise other kinds of lightening openings or openings for wires, hoses and the like, for example.

Furthermore, the curved element 7 shown in FIG. 7d comprises skin plate components 36a, 36b on the end sections, one surface thereof comprising reinforcements 20a, 20b in two transverse directions.

Figure 7E:
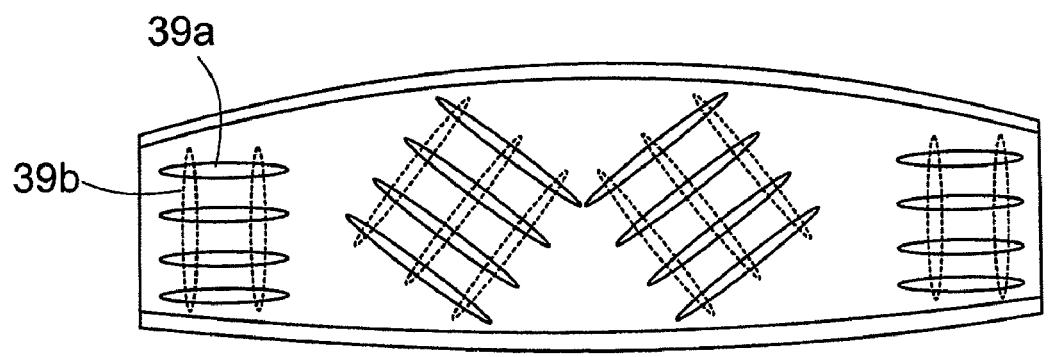

FIG. 7e shows reinforcements that are formed in a skin plate and that are profiles 39a, 39b having a predetermined length and arranged transverse relative to each other. The profile reinforcements 39a, 39b may constitute a latticed reinforcement structure relative to each other on the section of the entire curved element 7 or in restricted areas. Alternatively, the surface profiles of the skin plates 14, 21 may resemble a so-called egg crate structure comprising projections and recesses.

Figures 8A, 8B, 8C:
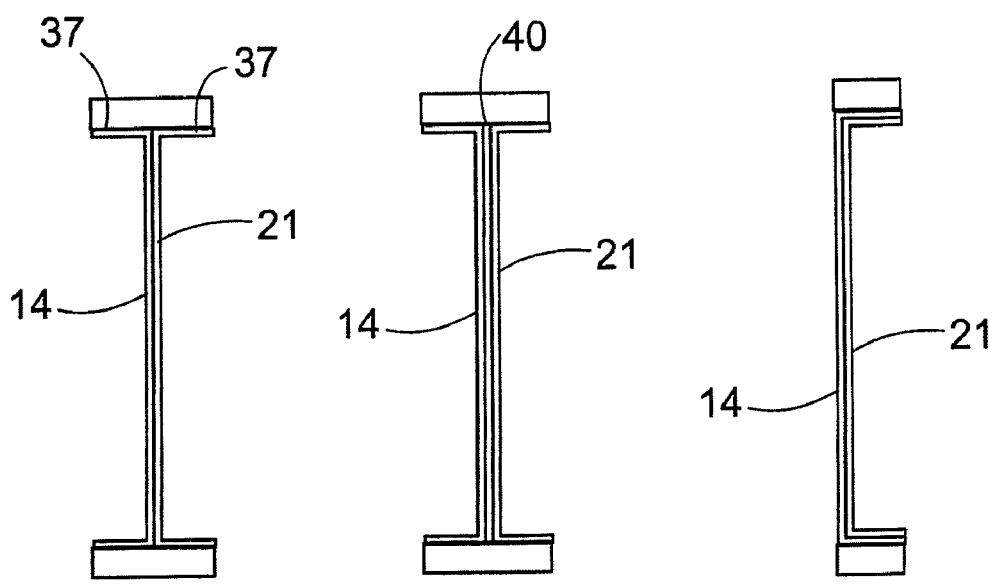

FIGS. 8a to 8c show different alternative structures of the curved element 7 seen in the longitudinal direction. For the sake of clarity, FIGS. 8a to 8c do not show any reinforcement profiles. The skin plates 14, 21 may comprise flanges 37, which may point away from each other, as is the case in FIGS. 8a and 8b, or they may point in the same direction, as is the case in FIG. 8c. FIG. 8b shows that one or more intermediate plates 40 or another additional reinforcement may be arranged between the skin plates 14, 21. The intermediate plate 40 may also comprise profile reinforcements.

The above-described reinforcement profiles 20, 25, 20a, 20b, 39a, 39b, their placement and structural details may be combined in order to achieve the desired strength properties.

Let is also be mentioned that the depth of the reinforcements may increase or decrease linearly. Alternatively, depth changes may be stepped or the changes may comply with some suitable arched curve.

Furthermore, the cross-sectional shape of the reinforcement 20, 25 may be substantially constant along its entire length or, alternatively, the cross-sectional shape may be adapted to change when observed in the longitudinal direction of the reinforcement, whereby the reinforcement profile may comprise sections having a different cross-sectional surface area.

Figure 9:
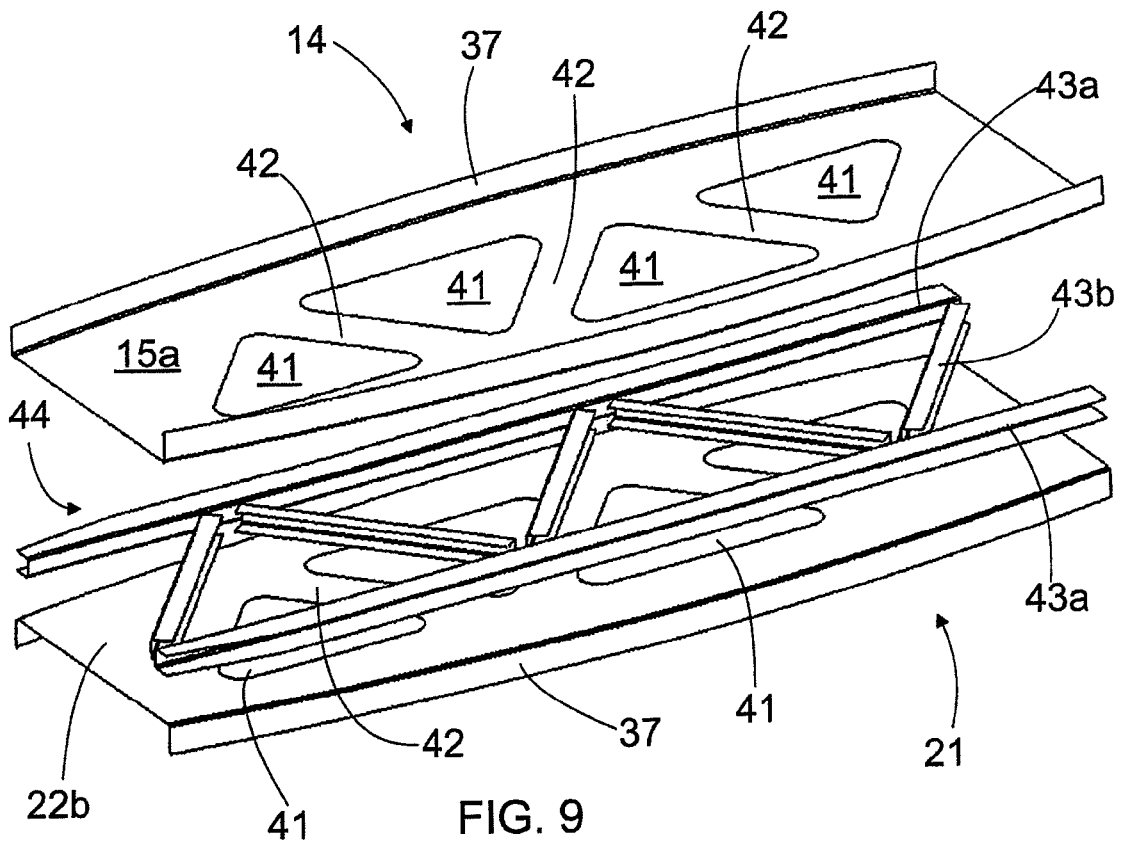
Figure 10:
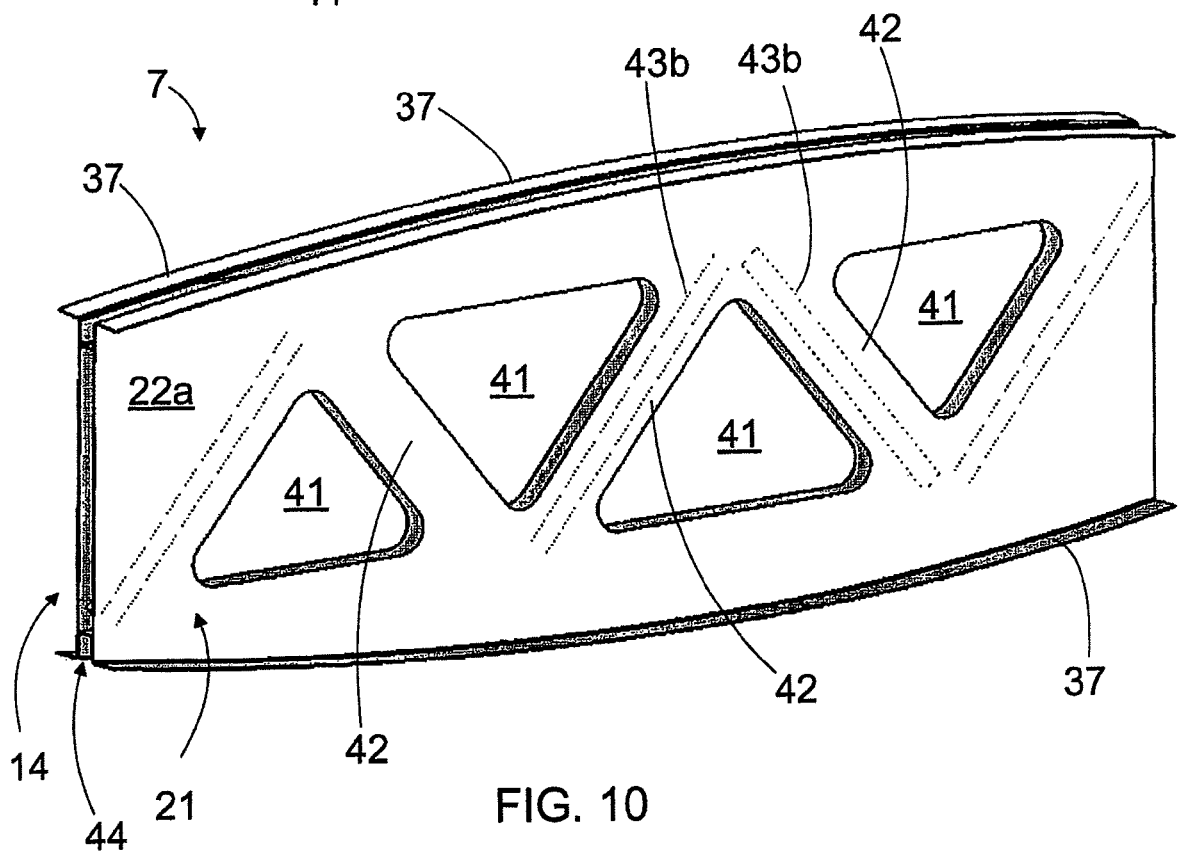

FIGS. 9 and 10 show yet an alternative solution to the different embodiments of the above-described curved element 7. This solution, too, may comprise a first skin plate 14 and a second skin plate 21 made from a composite material and having outer surfaces 15a, 22a that constitute the visible surfaces of the curved element 7. The skin plates 14, 21 may comprise a plurality of openings 41 for lightening the structure and simultaneously providing the skin plate with a latticed structure. The shape of the openings 41 may be a triangular shape with rounded corners, for example, whereby the divergent sections 42 remaining between the openings constitute diagonal, directed reinforcements. In the skin plates 14, 21, the openings 41 may be placed at the same or a different point relative to each other. In the latter case, the sections 42 of adjacent skin plates 14, 21 may be crosswise relative to each other. The inner surfaces 15b, 22b of the skin plates 14, 21 may be fastened against each other by means of an adhesive, for example. Alternatively, one or more reinforcement elements may be provided between the skin plates. The figure shows reinforcement elements 43a in the longitudinal direction of the curved element, and reinforcement elements 43b, arranged diagonally, the reinforcement elements constituting a latticed additional reinforcement 44 between the skin plates 14, 21. The reinforcement elements 43b may be provided on the sections 42 remaining between the openings 41 in the skin plates 14, 21. Alternatively, one or more intermediate plates provided with openings may be employed as an additional reinforcement 44. The additional reinforcements 44 may be fastened to the skin plates 14, 21 by means of an adhesive, for example. It is furthermore feasible that the curved element 7 is formed as one integrated piece by the RTM method, for example. It is to be noted that the number, shape, location and dimensions of the openings 41 may be dimensioned case-specifically, as may be the use and dimensions of any additional reinforcements 44. The long sides of the skin plates 14, 21 may be provided with transverse flanges 37. Both skin plates may comprise upper and lower flanges, allowing the flanges of the skin plates to be directed in opposite directions. In some cases, they may be directed in the same direction, whereby the skin plates are nested in a manner of speaking. In this case, the flanges of the outermost skin plate may be dimensioned longer than the flanges of the inner skin plate. It is further feasible that only one skin plate comprises flanges. On the other hand, the curved element may comprise a flange only at the upper or lower edge. The flange increases the rigidity of the curved element and facilitates the installation of the wing or the skin plates of the control surface or any stringers.

Let it be mentioned that the composite material may comprise one or more fibre reinforcements and one or more binding agents. The fibre reinforcement may be fibreglass, carbon fibre, aramid fibre or the like, for example. The binding agent may a plastic material, resin or the like, for example.

The composite parts may be manufactured by the RTM (Resin Transfer Moulding) method, for example. RTM is, in fact, suitable for the manufacture of complex pieces having accurate dimensions. The reinforcements or the reinforcement preforms are placed in a mould, and the mould is then closed. Resin or a corresponding binding agent may then be injected into the mould. Furthermore, the Prepreg material, i.e. a preimpregnated reinforcement, may be used, which may be hardened in an autoclave.

In some cases, the features disclosed in the present application may be used as such, irrespective of other features. On the other hand, the features disclosed in the present application may be combined for generating different combinations, if need be.

The drawings and the related description are only intended to illustrate the idea of the invention. The details of the invention may vary within the scope of the claims.

The invention claimed is:

1. A curved element, which is an elongated support piece, intended to be adapted to a space delimited by skin plates and edge spars in a wing, control surface or stabilizer of an aircraft, the curved element comprising:
    at least one skin plate,
    curved sides longitudinal relative to the skin plate and adaptable towards the skin plates of the wing, control surface or stabilizer,
    ends transverse relative to the skin plate and adaptable towards the edge spars of the wing, control surface or stabilizer,
    a plurality of reinforcements for increasing the rigidity of the skin plate,
    the curved element being manufactured from a composite material,
    the curved element comprises a first skin plate and a second skin plate,
    and
    at least one surface of both skin plates is provided with a plurality of directed profile reinforcements constituting an integrated part of the profile of the skin plate, wherein
the profile reinforcements of the first skin plate and the profile reinforcements of the second skin plate are in different directions relative to one another.

2. A curved element as claimed in claim 1, wherein the curved element comprises directed profile reinforcements in at least two transverse directions, the directed profile reinforcements constituting a latticed reinforcement structure in the curved element.

3. A curved element as claimed in claim 1, wherein at least one surface of at least one skin plate is corrugated on at least one or more predetermined sections of the surface of the skin plate.

4. A curved element as claimed in claim 1, wherein one skin plate is composed of at least one skin plate component that only partly covers the outer surface of the curved element, and the skin plate component is provided with profile reinforcements.

5. A curved element as claimed in claim 1, wherein
a thickening provided in the skin plate or the skin plate profile constitutes at least one profile reinforcement, the material thickness of the thickening being larger than that of sections between the profile reinforcements.

6. A curved element as claimed in claim 1, wherein
the curved element comprises two separately formed skin plates fastened to one another by means of an adhesive.

7. A curved element as claimed in claim 1, wherein
the curved element is one integral piece manufactured simultaneously in one mold.

8. A curved element as claimed in claim 1, wherein
at least one skin plate is provided with a plurality of openings, sections between which are arranged to constitute a plurality of directed profile reinforcements in at least two transverse directions, the sections constituting a latticed reinforcement structure in the curved element.

9. A wing of an aircraft, comprising:
at least one front spar in the area of the leading edge of the wing,
at least one rear spar in the area of the trailing edge of the wing,
a plurality of wing ribs between the front spar and the rear spar,
upper skin plates and lower skin plates,
a plurality of stringers between the skin plates and the wing ribs,
wherein at least one of the plurality of wing ribs comprises the curved element of claim 1.

10. A control surface of an aircraft, comprising:
at least one front spar in the area of the leading edge of the control surface,
at least one rear spar in the area of the trailing edge of the control surface,
a plurality of curved elements between the front spar and the rear spar,
upper skin plates and lower skin plates, wherein
at least one of the plurality of curved elements is the curved element according to claim 1.

11. A stabilizer of an aircraft, comprising:
at least one front spar in the area of the leading edge of the stabilizer,
at least one rear spar in the area of the trailing edge of the stabilizer,
a plurality of curved elements between the front spar and the rear spar,
upper skin plates and lower skin plates,
wherein at least one of the plurality of curved elements is the curved element according to claim 1.

12. A curved element, which is an elongated support piece, intended to be adapted to a space delimited by skin plates and edge spars in a wing, control surface or stabilizer of an aircraft, the curved element comprising:
at least one skin plate,
curved sides longitudinal relative to the skin plate and adaptable towards the skin plates of the wing, control surface or stabilizer,
ends transverse relative to the skin plate and adaptable towards the edge spars of the wing, control surface or stabilizer,
a plurality of reinforcements for increasing the rigidity of the skin plate,
the curved element being manufactured from a composite material,
the curved element comprises a first skin plate and a second skin plate, and
at least one surface of both skin plates is provided with a plurality of directed profile reinforcements constituting an integrated part of the profile of the skin plate, wherein
a protrusion on one side of the skin plate or the skin plate profile and a groove on an opposite side thereof constitute at least one profile reinforcement.

13. A curved element, which is an elongated support piece, intended to be adapted to a space delimited by skin plates and edge spars in a wing, control surface or stabilizer of an aircraft, the curved element comprising:
at least one skin plate,
curved sides longitudinal relative to the skin plate and adaptable towards the skin plates of the wing, control surface or stabilizer,
ends transverse relative to the skin plate and adaptable towards the edge spars of the wing, control surface or stabilizer,
a plurality of reinforcements for increasing the rigidity of the skin plate,
the curved element being manufactured from a composite material,
the curved element comprises a first skin plate and a second skin plate, and
at least one surface of both skin plates is provided with a plurality of directed profile reinforcements constituting an integrated part of the profile of the skin plate, wherein
the curved element comprises directed profile reinforcements in at least two transverse directions, the directed profile reinforcements constituting a latticed reinforcement structure in the curved element, and
the profile reinforcements in transverse directions relative to one another are arranged perpendicularly relative to one another.

14. A curved element, which is an elongated support piece, intended to be adapted to a space delimited by skin plates and edge spars in a wing, control surface or stabilizer of an aircraft, the curved element comprising:
at least one skin plate,
curved sides longitudinal relative to the skin plate and adaptable towards the skin plates of the wing, control surface or stabilizer,
ends transverse relative to the skin plate and adaptable towards the edge spars of the wing, control surface or stabilizer,
a plurality of reinforcements for increasing the rigidity of the skin plate,
the curved element being manufactured from a composite material,
the curved element comprises a first skin plate and a second skin plate, and at least one surface of both skin plates is provided with a plurality of directed profile reinforcements constituting an integrated part of the profile of the skin plate, wherein the curved element comprises directed profile reinforcements in at least two transverse directions, the directed profile reinforcements constituting a latticed reinforcement structure in the curved element, and the profile reinforcements in transverse directions relative to one another are arranged diagonally, being at a predetermined angle relative to the longitudinal axis of the curved element.

15. A wing of an aircraft, comprising:

at least one front spar in the area of the leading edge of the wing, at least one rear spar in the area of the trailing edge of the wing, a plurality of wing ribs between the front spar and the rear spar, upper skin plates and lower skin plates, a plurality of stringers between the skin plates and the wing ribs, wherein at least one of the plurality of wing ribs comprises the curved element of claim 14.

16. A control surface of an aircraft, comprising:

at least one front spar in the area of the leading edge of the control surface, at least one rear spar in the area of the trailing edge of the control surface, a plurality of curved elements between the front spar and the rear spar, upper skin plates and lower skin plates, wherein at least one of the plurality of curved elements is the curved element according to claim 14.

17. A stabilizer of an aircraft, comprising:

at least one front spar in the area of the leading edge of the stabilizer, at least one rear spar in the area of the trailing edge of the stabilizer, a plurality of curved elements between the front spar and the rear spar, upper skin plates and lower skin plates, wherein at least one of the plurality of curved elements is the curved element according to claim 14.

\* \* \* \* \*